(12) United States Patent
Rizzuto, Jr.

(10) Patent No.: US 7,550,669 B2
(45) Date of Patent: Jun. 23, 2009

(54) SLIP-JOINT CONNECTION FOR ELECTRIC SERVICE CONDUIT TO SERVICE BOXES

(76) Inventor: Salvatore A. Rizzuto, Jr., 4261 David Dr., Emmaus, PA (US) 18049

(*) Notice: Subject to any disclaimer, the term of this patent is extended or adjusted under 35 U.S.C. 154(b) by 348 days.

(21) Appl. No.: 11/098,860

(22) Filed: Apr. 5, 2005

(65) Prior Publication Data
US 2005/0217882 A1   Oct. 6, 2005

Related U.S. Application Data

(60) Provisional application No. 60/559,623, filed on Apr. 5, 2004.

(51) Int. Cl.
*H02G 3/04* (2006.01)
(52) U.S. Cl. ............ 174/68.1; 174/481; 174/68.3; 174/72 A; 138/155; 138/120; 285/302; 285/145.1
(58) Field of Classification Search ............ 174/480, 174/481, 650, 68.1, 68.3, 72 A, 84 R, 38, 174/86, 50; 138/118, 155, 120, 110, 177, 138/103; 285/345, 302, 151.1, 239, 145.1, 285/20, 333, 383, 19, 381.1, 31; 29/508
See application file for complete search history.

(56) References Cited

U.S. PATENT DOCUMENTS

| | | | | |
|---|---|---|---|---|
| 1,580,325 A * | 4/1926 | Perry | ............ | 285/302 |
| 1,987,372 A * | 1/1935 | Schellhammer | ............ | 285/302 |
| 2,100,796 A * | 11/1937 | Church | ............ | 285/151.1 |
| 2,900,436 A * | 8/1959 | Appleton | ............ | 174/86 |
| 3,730,228 A * | 5/1973 | Gibbs, Sr. | ............ | 285/302 |
| 3,794,080 A * | 2/1974 | Huston et al. | ............ | 285/239 |
| 4,023,831 A * | 5/1977 | Thompson | ............ | 285/302 |
| 4,033,020 A * | 7/1977 | Hudgens | ............ | 29/508 |
| 4,109,097 A * | 8/1978 | Berry | ............ | 174/86 |
| 4,223,702 A * | 9/1980 | Cook | ............ | 285/302 |
| 4,371,198 A * | 2/1983 | Martin | ............ | 285/145.1 |
| 4,687,232 A * | 8/1987 | Zimmerman, Harry M. | | 285/302 |
| 4,720,124 A * | 1/1988 | Taylor et al. | ............ | 285/381.1 |
| 4,861,942 A * | 8/1989 | Moran, Jr. | ............ | 174/38 |
| 5,141,258 A * | 8/1992 | Stine | ............ | 285/31 |
| 5,174,340 A * | 12/1992 | Peterson et al. | ............ | 138/110 |
| 5,635,675 A * | 6/1997 | Houga | ............ | 174/68.3 |
| 6,220,605 B1 * | 4/2001 | Becker, Jr. | ............ | 285/345 |
| 6,449,942 B1 * | 9/2002 | Dean et al. | ............ | 285/302 |
| 6,476,322 B1 * | 11/2002 | Dunne et al. | ............ | 174/68.1 |
| 6,532,993 B2 * | 3/2003 | Albino | ............ | 285/381.1 |
| 6,689,953 B2 * | 2/2004 | Baldwin | ............ | 174/50 |
| 6,734,360 B2 * | 5/2004 | Magno | ............ | 174/84 R |

* cited by examiner

*Primary Examiner*—Angel R Estrada
(74) *Attorney, Agent, or Firm*—Charles A. Wilkinson; Clinton H. Wilkinson (57) ABSTRACT

A fitting is provided for slip fit adjustment of conduit leading from an electric service box on a building to an underground electric service line to allow for subsidence of the ground level without excessive force on the service box even when sections of the conduit are not in alignment.

17 Claims, 5 Drawing Sheets

SLIP-JOINT CONNECTION FOR ELECTRIC SERVICE CONDUIT TO SERVICE BOXES

REFERENCE TO RELATED APPLICATIONS

This application claims priority from Provisional Application 60/559,623 filed Apr. 5, 2004 by the same inventor.

FIELD OF THE INVENTION

This invention relates generally to electric service for residences and businesses and more particularly to the provision of slip-joints on electrical conduit leading from underground electrical service lines to electrical service boxes on the exterior of a building.

PRELIMINARY DISCUSSION

In the connection of underground electric service to building structures, difficulty has been encountered with settling of backfill over the electrical conduits on building sites. It is not unusual for such backfill to settle several feet or more carrying the conduits surrounding the service along with it. Even if the service wires are not broken or disconnected by the resulting tension exerted on them, sections of the protective conduit around the service wires are frequently pulled apart or away from each other or from the service box, exposing the service wires and sometimes even pulling the building service box away from its anchoring or even breaking away portions of the building structure to which the service extends.

This problem has been recognized before in, for example, U.S. Pat. No. 4,961,942 issued to T. F. Moran, Jr. on Aug. 29, 1989, entitled "Adjustable Riser Assembly", which discloses an adjustable length conduit for protecting underground electrical power service wires between the ground and an exterior above ground service box. The prior art riser assembly provided by Moran is comprised of a first lower conduit section the lower end of which extends into the ground and has a bend of at least 30° on such end, and a second rigid conduit which connects to the service box on the other end and has a larger overall diameter along its lower end in order to slidingly receive the upper end of the lower conduit section. A very close tolerance is provided between the outer diameter of the lower conduit section and the inner diameter of the upper conduit section, with such diameters being substantially the same so that at least partial sealing between the two diameter conduits is effected. Such close tolerance is necessary to keep insects and small animals from gaining access to the junction box particularly since the slight warmth of wires through which a current is flowing is very attractive to such organisms. The two conduits overlap and allow for subsidence of the ground surface in new construction while maintaining a substantially sealed conduit protection of the electrical service wires between the service box and the ground. Such continued protection is important not only to prevent children or others from gaining access to and possible experiencing injury from the charged service wires, but also, as noted, to keep insects and small animals out of the service box and the interior of the building and to prevent the service box in an extreme, but not uncommon, case from being bodily ripped from its position on the wall. The Moran Jr. invention therefore addressed a very serious consequence of backfill settlement in building construction by use of a type of slip-joint between connecting conduits.

There are several problems, however, with the Moran, Jr. riser protection assembly which make it, in actual practice, impractical and difficult to use and install. First, the close sliding fitting or tolerance between the conduits does not allow for any lateral or side to side movement of the lower conduit with respect to the upper conduit. Thus, if the lower conduit is not installed so that it is exactly aligned with the upper conduit, the outer edge of the lower conduit will press against the inner side of the upper conduit and will not slide easily or possibly even at all due to frictional forces between the conduits. This makes the Moran, Jr. protective assembly very difficult to hook up, or install, since, in most cases, it is difficult and time consuming to install the conduits so that they are exactly aligned. For example, if the building surface to which the conduits are connected by straps is not smooth or completely vertical, the conduit attached to it may not be pointed directly downwardly. Nor is the lower conduit likely to be exactly vertical. It is almost the rule rather than the exception that the side of a residence will not be exactly in line with the foundation of the structure so that any conduit closely attached to both is likely to be at least slightly out of line. In addition, current electrical code standards usually require that there be at least two straps or brackets securing such conduits to a wall surface, with at least one of these brackets below the ground level and the other near the service box. Furthermore, just as settling forces may cause downward strain on a non adjustable conduit, such forces may also place significant lateral pressure on the below ground portion of the adjustable conduit which may in itself exert sufficient force to loosen the conduit from the wall. Yet another problem with the Moran, Jr. assembly is that if the upper slightly larger conduit and the lower smaller conduit are not exactly aligned, when the smaller enters into the larger it can be inserted only a minimal distance before its edge begins to severely impact the inside of the larger pipe and refuses to slide further without displacing the larger conduit which may be already secured to the wall when the electric lines are installed. Consequently, the lower small conduit is extremely difficult to install or insert into the larger upper conduit, again primarily due to the close fit or tolerance between the upper and lower conduits. Thus, unless backfilling of the electric service trench is delayed until the service is connected, it may be virtually impossible to connect the sliding fit between the Moran, Jr. conduits. Furthermore, as far as the present inventor is aware, there are no standard sized thermoplastic or polyvinyl chloride pipes or conduits wherein the inner diameter of one such conduit is substantially the same as the outer diameter of the other such conduit. Therefore, manufacturing of special conduits is required to use the Moran, Jr. assembly, which is obviously inconvenient and expensive.

An even more serious problem with arrangements like the Moran slip-joint is that, if the two sections of the slip-joint are not correctly aligned as they are attached to a building wall, the edge of the smaller section may be jammed against the side of the other larger section to such an extent, or with such force, that the slip-joint becomes inoperative and, if there is subsidence of the ground, all the subsidence force may be applied to the conduit on both sides as well as the junction box pulling both from the wall of the building or breaking the intervening conduit.

The present inventor has recognized the disadvantages of known sliding or slip-joint type devices, and has conceived of a new assembly that overcomes all of such disadvantages. In particular, the present inventor has solved the problem of the lateral stress placed on the sliding portions of the slip-joint intermediate of the conduits on both sides by using a larger inside diameter conduit assembly or fitting as the outer conduit so there is significant clearance between the two plus placing a deformable sealing ring at the end of such fitting between the two conduit sections. The deformable sealing ring is secured preferably to the inner diameter on the lower end of the assembly, so that the section of conduit that extends into the ground will connect with such assembly with a close fit between it and the sealing ring, rather than with the inner diameter of the assembly or fitting itself. Not only does this make the assembly easier to install, since the assembly of the invention and lower conduit section do not have to be exactly parallel for the two structures to slide easily together, but in addition if settling forces later cause the conduit to be forced or urged laterally, the apparatus will still work effectively by adjusting to such forces. Furthermore, the present inventor's assembly does not require the manufacture or use of special sized or constructed conduits, therefore decreasing the cost of such assembly.

DISCUSSION OF THE PRIOR ART

U.S. Pat. No. 1,580,325 issued to L. H. Perry on Apr. 13, 1926, entitled "Expansion Joint", discloses an expansion joint for use in wells, where temperature differences cause longitudinal expansion of the well lines. The Perry reference does not disclose the present applicant's expansion arrangement, however.

U.S. Pat. No. 1,987,372 issued to A. L. Schellhammer on Jan. 8, 1935, entitled "Pipe Joint", discloses a joint for large diameter stove or furnace pipes that allows such pipes to expand and eliminates "expansion noises". A lining of aluminum or copper is provided between such joints, so that when the pipes are heated and slide relative to each other via the joint, the expansion noises are eliminated. Schellhammer thus discloses another early simple expansion or slip-joint, but does not attempt to allow for misalignment of the piping by allowing spacing between them to compensate for misalignment.

U.S. Pat. No. 2,900,426 issued to A. I. Appleton on Aug. 18, 1959, entitled "Electrical Conduit Union and Expansion Coupling", discloses an expansion coupling for use with a conduit housing electrical wiring running between two switch boxes. Inner and outer (20 and 21) telescopingly connected cylindrical members are provided having a close tolerance. The Appleton coupling is meant to be "explosion-proof" by providing close tolerances in the sliding joint separating inner and outer atmospheres or environments and does not allow for misalignment.

U.S. Pat. No. 3,730,228 issued to P. H. Gibbs, Sr. on May 1, 1973, entitled "Hose-Case Assembly", discloses a telescoping hose case or support comprising several telescopingly connected tubular sections. Gibbs therefore is a simple example of a conduit having an adjustable length, although for a different purpose and does not disclose the present applicant's arrangement.

U.S. Pat. No. 3,794,080 issued to P. O. Huston et al. on Feb. 26, 1974, entitled "Corrugated Flexible Hose", discloses a flexible tubing or hose having corrugations with differently dimensioned corrugations on or near the end cuffs which make the device stiffer on such ends. The Huston et al. tubing is an example of a tubing that could be used for various purposes, and in addition which could expand or lengthen or presumably flex as a result of the corrugations in response to forces on the hose. However, the intended purpose appears to be simply to provide a better flexible hose.

U.S. Pat. No. 4,023,831 issued to D. M. Thompson on May 17, 1977, entitled "Plastic Pipe Fifting", discloses a plastic sliding coupling for pipe. Applicant's misalignment compensation feature is not disclosed, however.

U.S. Pat. No. 4,033,020 issued to B. C. Hudgens on Jul. 5, 1977, entitled "Method of Making a Slip Joint", discloses a slip joint having inner and outer members spaced apart by a plastic member. Once joined, the end of the outer member is crimped or deformed, placing the plastic under compressive stress against the inner member. Some of this stress is then relieved by heating the plastic member, but results in a slip joint having very close tolerances. Hudgens therefore teaches a specific slip joint arrangement for plastic conduit or pipe, but does not disclose the present applicant's arrangement.

U.S. Pat. No. 4,109,097 issued to R. C. Berry on Aug. 22, 1978, entitled "Expansion-Deflection Coupling", discloses a flexible joint between rigid PUC conduit formed from a flexible plastic sleeve strapped to two special connectors on the PUC conduit to form a converting surface with the flexible plastic tube and allow for misalignment to the conduit. The arrangement is not that of the present applicant.

U.S. Pat. No. 4,223,702 issued to J. Cook on Sep. 23, 1980, entitled "Drain Line for Recreational Vehicles", discloses a telescoping conduit that is used as a drain line, but does not disclose the present applicant's misalignment prevention arrangement.

U.S. Pat. No. 4,371,198 issued to C. F. Martin on Feb. 1, 1983, entitled Apparatus for Connecting Tubular Members", discloses an apparatus including a slip joint assembly for connecting tubular pipe sections, particularly in an underwater environment. As shown in FIG. 1, the slip joint (16) is connected to conduits (10 and 12) via boltless connection assemblies (18 and 14) on the ends of the conduits. The slip joint includes an inner tubular member (46) which telescopingly and slidably receives in outer tubular member (48), and a means for creating a fluid tight seal between the members is provided. The exact length of the slip joint is lengthened or shortened using a hydraulic pressure means. Therefore, the length of the slip joint is not allowed to adjust automatically as in the present applicant's invention. Some rotational misalignment compensation is also apparently allowed by a parted ball joint assembly, but the joint does not operate in the manner of the present applicant's slip-joint.

U.S. Pat. No. 4,687,232 issued to H. M. Zimmerman on Aug. 18, 1987, entitled "Pipe Slip Joint System", discloses a water tight slip joint-type piper coupling. The Zimmerman slip joint appears to be primarily for mending a broken underground pipeline and does not include the present applicant's arrangement.

U.S. Pat. No. 4,720,124 issued to W. M. Taylor et al. on Jan. 19, 1988, entitled "Telescoping Joint", discloses another slip joint for connecting underwater pipes having a metal-to-metal seal to prevent leakage into and out of the pipes. The Martin and Taylor et al. patent illustrates the wide use of telescoping joints in joining subsea pipes or conduits.

U.S. Pat. No. 4,861,942 issued to T. F. Moran, Jr. on Aug. 29, 1989, entitled "Adjustable Riser Assembly", which has also been discussed above by way of introduction, discloses a telescoping conduit used as a riser to protect an electrical cable extending from underground to a meter box that is designed to eliminate any stress placed both on the electrical cable and the riser due to the ground settling. As shown in the FIGS., riser assembly (10) is comprised of first and second rigid cylindrical plastic conduits (11 and 12). The lower conduit (11) has an at least 30 degree bend at its lower end, while the upper end of conduit (11) is slidingly received in the enlarged diameter lower end of conduit (12), with such lower end preferably having a length of about 12 inches. A male threaded fitting is provided on the upper end of conduit (12) which is used to attach the conduit to an electrical box mounted on the vertical outside wall of a structure, and an electrical cable (27) is placed in the conduit. As stated in Column 3, Lines 24-26, the telescoping riser assembly "provides up to 12 inches in adjustment of vertical height". The Moran, Jr. patent discloses a riser assembly that addresses the same problem as the present applicant's slip-joint assembly, but does not introduce the further alignment adjustment feature of applicant's invention.

U.S. Pat. No. 5,141,258 issued to H. L. Stine on Aug. 25, 1992, entitled "Expansion Joint for Conduit for Cables", discloses a slip-type joint for connecting two pieces of a conduit for cables. The Stine joint includes two sleeve members (28 and 30) having a circular cross section on one end and a square cross section on the other end, with the sleeves telescopingly connecting on their square ends. The square cross section is provided to prevent the conduits from rotating and thereby coming off their threads where connected to a regular conduit, which is fairly common in above ground applications where vibrations may effect the conduit. Stine broadly shows another expansion joint for use with a cable conduit, but does not show or suggest the present applicant's invention.

U.S. Pat. No. 5,174,340 issued to J. L. Peterson et al. on Dec. 29, 1992, entitled "Apparatus for Preventing Casing Damage Due to Formation Compaction", discloses a device for preventing well casing formation compaction in deep water wells. The "Background" section (Column 1) states that one known solution to compaction is to provide a slip joint in the casing to prevent buckling. The patent is directed to a casing joint that may compress or shorten as the formation compacts. It apparently does not, however, expand as a result of such forces and the present applicant's invention is neither shown nor suggested.

U.S. Pat. No. 5,635,675 issued to M. Houga on Jun. 3, 1997, entitled "Bendable Protective Tubing for Buried Cables", discloses a tubing comprised of a plurality of tubing sections secured together by S-shaped nodes which allow the tubing to bend somewhat at the nodes. Each node has a rigid portion and a deformable portion protected from damage by the rigid portion. This invention is an example of a recent improvement in conduit for housing buried cables, although the conduit does not telescopingly expand via a slip joint.

U.S. Pat. No. 6,220,605 issued to T. H. Becker, Jr. on Apr. 24, 2001, entitled "Slip Joint Connection for Engine Exhaust System", discloses an exhaust manifold slip joint to account for thermal expansion due to engine heat. A sleeve assembly is also provided to seal the connection between the sections of the slip joint. The Becker slip joint patent is mentioned as an example of a recently allowed patent for a slip joint for a particular use.

U.S. Pat. No. 6,449,942 issued to M. R. Dean et al. on Sep. 17, 2002, entitled "Slip Join Duct System", discloses a duct system primarily for connecting a rocket fuel tank and a rocket engine, wherein duct sections are connected by a slip joint. Gimbal joints (24 and 40) are provided to allow for some angular motion, and the end portions of the duct sections are slidably engaged via the slip joint to allow for some relative linear motion. As shown in FIG. 3, the inner portion (28) of the slip joint contains several annular grooves (50 and 52) on its outer wall (29), which grooves receive annular seal rings (60 and 62) on the outer section of the slip joint. The Dean et al. slip joint arrangement therefore allows for a fairly limited amount of relative linear movement, rather than the up to twelve (12) to sixteen (16) or more inches of movement allowed by applicant's slip-joint invention.

U.S. Pat. No. 6,476,332 issued to D. J. Dunne et al. on Nov. 5, 2002, entitled "Conduits", discloses an arrangement for connecting cable conduits wherein the sections of conduit are connected together by "push on connectors". The arrangement is not like that of the present applicant.

U.S. Pat. No. 6,532,993 issued to M. Albino on Mar. 18, 2003, entitled "Underground Piping System", discloses a kit for installing underground piping wherein sections of pipe are connected by flexible connecting sections and then sealed. The flexible sections are preferably made of CSST (corrugated stainless steel tubing), which apparently provides both longitudinal and lateral adjustment.

U.S. Pat. No. 6,689,953 issued to R. M Baldwin on Feb. 10, 2004, entitled "Flexible Mast/Meter Can Connector", discloses a pivotable coupling (18) for connecting an electrical meter to a service mast holding an overhead electrical line. The coupling enables the service mast to be pivoted relative to the meter box without causing any damage. This is another version of an adjustment device for allowing adjustment of an open air connection with a meter which prevents the meter from being pulled loose from a wall as a result of heavy pull upon the cable. There are several embodiments including a hinged tubing extension, a corrugated flexible connection, and a breakaway support arrangement. The present applicant's invention is neither described nor suggested, however.

U.S. Pat. No. 6,734,360 issues to J. M. D. Magno on May 11, 2004, entitled "Ground Expansion Joint Coupling", discloses an expansion joint in which an embodiment shown in FIG. 8 has an external shape somewhat reminiscent of the present applicant's external expansion joint body but as is evident from FIG. 7 such shape has a completely different function and is not overall similar to the present invention. The principal aim of the Magno structure is to maintain grounding continuity and not to adjust for misalignment of connecting conduit.

U.S. Patent Application Publication No. 2003/0094208 entitled "Exhaust Pipe, and Method of Making an Exhaust Pipe", filed by H. Gabriel et al. and published on May 22, 2003, discloses a vehicle exhaust pipe whereby a triple sliding fit arrangement is provided. The arrangement is not like that of the present applicant, however.

While there have been, therefore, numerous inventions for slip-joints in the past including slip-joints for electrical conduits, so far as the present applicant is aware none has solved the problems addressed by the present applicant's invention which allows, in a simple and effective manner, for misalignment between the connected ends of conduit on the wall of a building both in installation and at the time of any subsidence of construction fill or other ground material in which electrical conduit and cable may be buried.

OBJECTS OF THE INVENTION

It is an object of the invention, therefore, to provide a slip-joint for connecting conduit leading from a junction box on the wall of a building or the like with conduit extending into the ground in a manner which allows for possible misalignment of conduit sections and allows both convenient installation of such slip-joint and prevents jamming of such slip-joint which might cause it to become inoperative when needed.

It is a still further object of the invention to provide a slip-joint having an effective clearance between an outside member and an inner member mutually slidable with respect to each other, such clearance being sealed by a flexible slip ring at one end of the larger diameter member.

It is a still further object of the invention to provide an effective slip-joint having a substantial tolerance for misalignment between two interconnected conduits.

It is a still further object of the invention to provide a slip-joint between two conduits between an underground service line and a wall mounted electrical service box which will allow effective longitudinal adjustment without danger of binding and resultant inoperativeness.

It is a still further object of the invention to provide a slip-joint structure having an inner circumference sufficiently greater than an internal members outer circumference plus a flexible seal contacting said inner and outer circumferences at one end of one member.

It is a still further object of the invention to have the flexible seal positioned at the end of the larger member from which the smaller member enters said larger member.

Other objects and advantages of the invention will become evident from review of the following description together with the attached drawing figures.

SUMMARY OF THE INVENTION

A slip-joint structure for connecting an underground originating electric cable conduit with a service box mounted upon a building wall is constructed from two conduit sections having an effective difference between the inner diameter or circumference of the larger and the outer diameter or circumference of the smaller with a sealing means between the two which allows a minimum desired clearance become the two effective to prevent a given degree of longitudinal misalignment between the two from causing difficulty in installation or later potential interference with longitudinal movement between the two.

DESCRIPTION OF THE PREFERRED EMBODIMENTS

The following is a detailed description of the best mode or modes of the invention presently contemplated. Such description is not intended to be understood in a limiting sense, but to be an example of the invention presented solely for illustration thereof and by reference to which in connection with the following description and the accompanying drawings one skilled in the art may be advised of the advantages and construction of the invention.

At one time all, or most, electric service was provided to buildings through overhead wires. These were typically at one time connected to the buildings at or in the vicinity of the roof line or an upper story down to an outside service box easily accessible to service personnel and meter readers and then through a wall opening into the building. Later a protective conduit was added in most buildings from the attachment to the wall of the budding to the service box. In large cities with great numbers of elevated wires and in more prestigious suburbs where, overhead wires were deemed objectionable, underground service then began to be provided in which electric cable was run from outside poles or hookups through underground cables to the service box. Underground service is protected from deleterious weather influences, but is subject to damage from underground influences particularly various digging activities and subsidence of ground level. Such underground cable is frequently run through underground protective conduit to protect the primary electric cable inside from external damage or perforation. The cable is then run from the underground conduit, if present, through conduit angled upward to connect to the service box. Particularly in developments built on filled in ground, but also in locations where there has been substantial excavation for cellars and other foundation construction with later backfill, there may be substantial subsidence of the ground, particularly in filled in areas during rainy weather and the like. In such areas buried cable and particularly cable run in protective conduit, may, as a consequence, drop or subside with the ground several feet placing severe stress upon the wire service entering a building such as a residence or the like. In such cases, the conduit passing from the ground to the service box is likely to be broken or pulled from the service box exposing live wires with resultant hazard due to possible electrocution or fire and not infrequently also resulting in pulling of the service box from the wall. Upon such an occurrence, not only is there danger to the public, but a considerable number of man hours may be expended by a power company or electric supplier in repair of damaged service installations. In such cases the power company cannot bill the customer for repairs because the service lines up to and including the service box invariably are owned by and serviced directly by the electric supplier.

The Moran U.S. Pat. No. 4,861,942 proposed to remedy the above described situation by providing a slip-joint between the underground service conduit, or simply underground service wires, by providing a slip-joint connection between the external service box and the underground wires. Unfortunately, these slip-joint arrangements were found difficult to install and sometimes failed to slip when lateral forces were imposed upon them.

The present inventor has developed an improved electrical conduit slip or expansion joint in which the joint instead of being composed of two closely spaced conduit or pipe sections one within the other, is instead comprised of two conduit sections having a critical space or clearance between the two conduit sections of the slip-joint, sealing in such space being maintained at one point by a flexible sealing ring which not only seals the space between the two conduit sections while allowing the two sections to slip past each other, but also allows the end of the inner conduit to move laterally within the outer conduit a distance depending upon the overlap maintained between the two, and also allows the inner conduit to assume a slight angle with respect to the larger conduit without jamming the slip relationship while also enabling the slip-joint section to be installed together between conduit sections even though such sections are not exactly in line. The relative inside and outside diameters of the members of the slip-joint and the thickness of the slip sealing ring or sealing means between the two, as well as the relative shapes of the two members and the degree of overlap at any given time of the two members determines the degree to which two conduits on both ends of the slip-joint of the invention can be misaligned without encountering difficulty. Furthermore, the arrangement of the invention tends to be self relieving as subsidence of an underground cable system occurs, since as the two portions of the slip-joint are pulled apart additional room is developed for misalignment between the two parts attached to external conduit runs. Thus, as subsidence progresses the relative positions of misaligned external structures may also increase without jamming the slip-joint of the invention. The degree or amount of subsidence expected or thought possible or likely in any given installation will determine the length of overlap of the slip-joint sections and therefore the length of the slip-joint fitting of the invention and the diameter of the conduit to be attached to the slip-joint unit will determine the fittings provided on the end. Good compromise dimensions have been found to be a fitting having an overall length of approximately 24 inches accommodating at least a one and a half foot maximum overlap in the interior.

Figure 1:
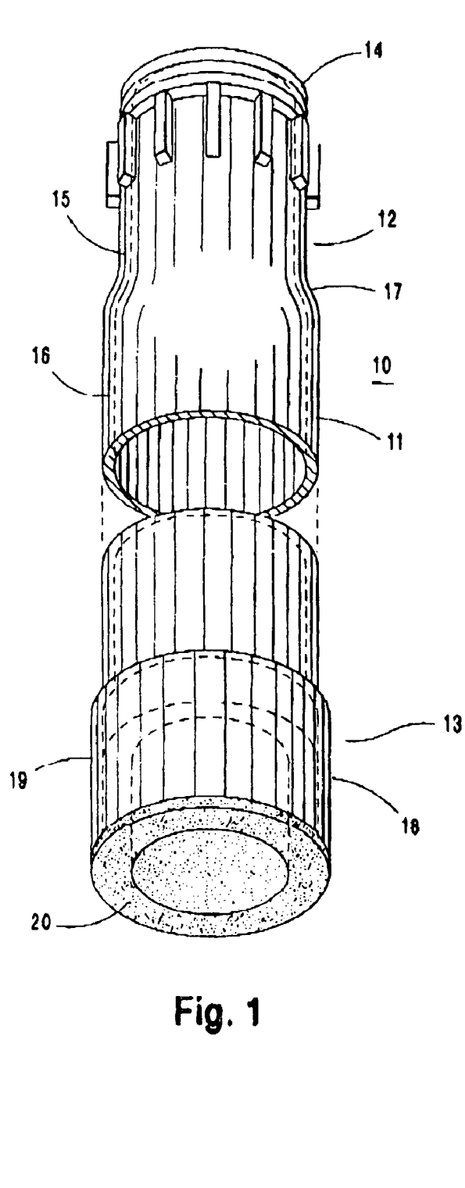
FIG. 1 attached is an isometric centrally bisected view of the outside diameter of the conduit expansion fitting which is the subject of the invention.
Figure 2:
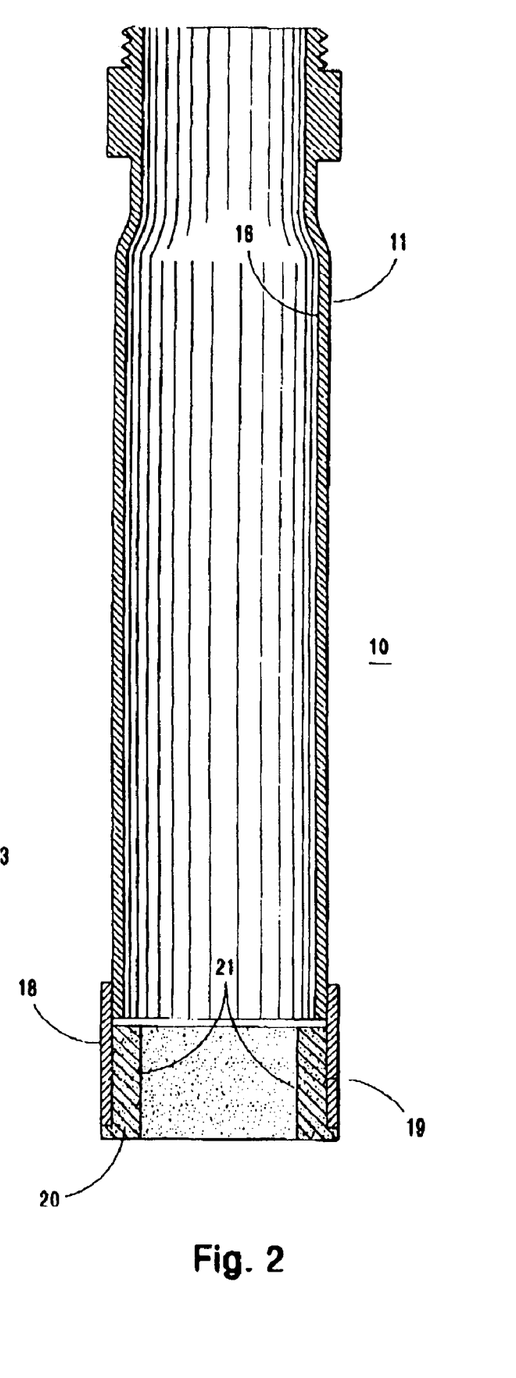
FIG. 2 is a cross-section of said fitting.
Figure 4:
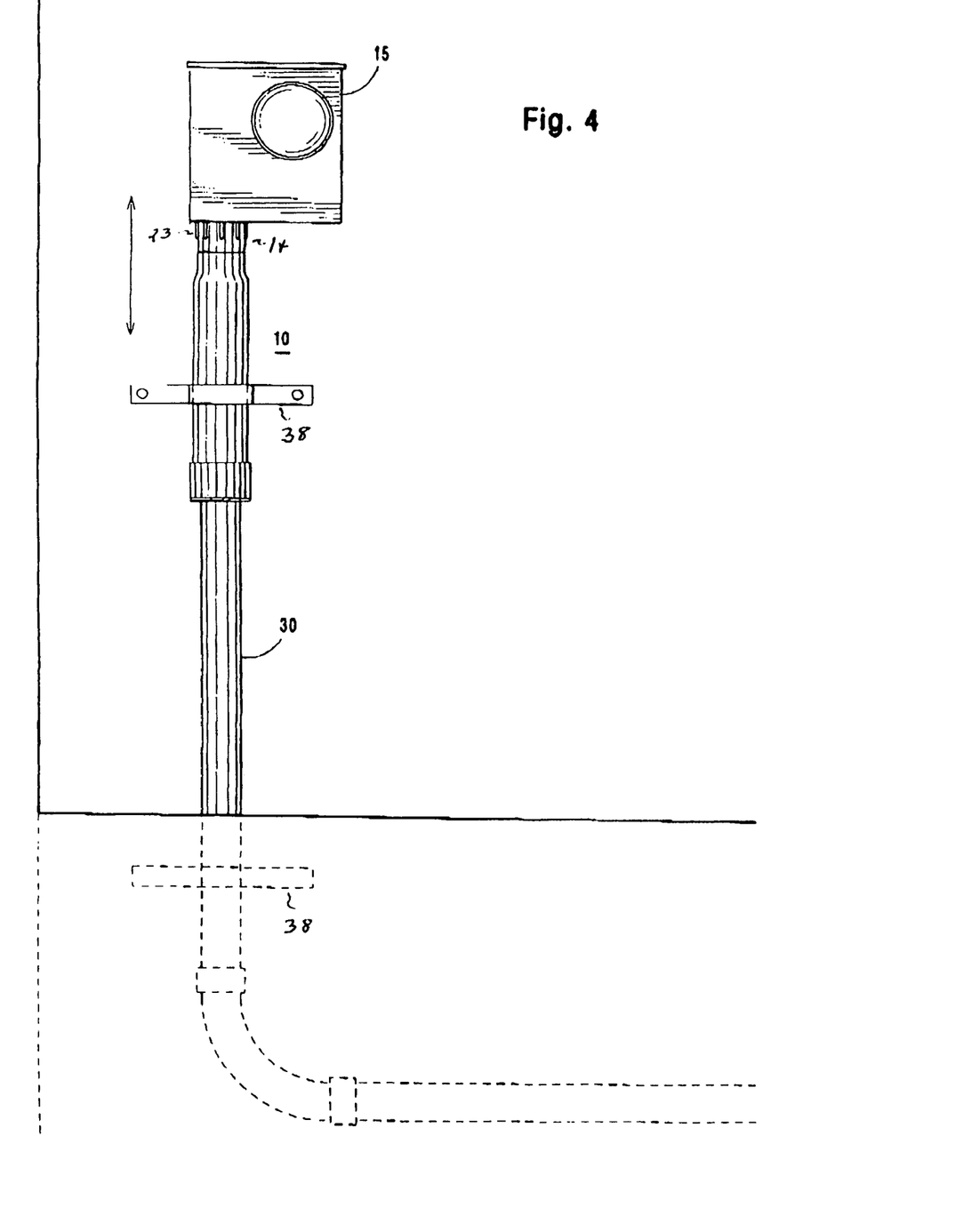
FIG. 4 is a sketch of the mounting of said fitting on the wall of a building next to a section of conduit buried in a back filled section of ground beside the building.

FIG. 1, which is an isometric centrally broken illustration of one preferred embodiment of the invention, which illustrates the slip joint fitting or assembly 10 of the present invention, which assembly is comprised of a rigid conduit section 11 having an upper end 12 and a lower end 13. A screw threaded section or fitting 14 for connecting upper end 12 of the fitting assembly 10 to an electrical circuit or service box 15, as shown in FIG. 4, is provided. Fitting or threaded section 14 is preferably integrally connected to, or a part of, conduit 11, although it may also be a separate coupling adhesively or otherwise permanently secured to upper end 12 of fitting 10 by any suitable means. Such connecting means will usually comprise screw threads as shown in FIGS. 1 and 2, but could comprise any appropriate connection for the particular service box connection. Typically, fitting 14 will have an inner diameter 15 of three (3) inches, while conduit section 11 will have a larger inner diameter 16 of four (4) inches or more. An angled section 17 provides a smooth transition between inner diameters 15 and 16 both on the outside, or OD, of the fitting and the inside, or ID, of the fitting. Either small spaced detents 23, as shown, or a flange, not shown, below the threads on the fitting 14 serve to limit the entrance of the threaded end of the fitting too far into the lower end of the service box. Connected to lower end 13 is cap 18, which cap 18 has an inner diameter 19 greater than the inner diameter 16 of conduit section 11. Finally, deformable sealing ring 20 is secured along the inner surface or diameter 19 of cap 18. Alternatively, the sealing ring 20 may be mounted directly in the end of the larger conduit section of the fitting 10, which would be preferably, but not necessarily increased in overall inside and outside diameter at this point, rather than in a separate cap section shown in FIGS. 1 and 2. The fitting 10 is shown in FIG. 1 bisected in the center for convenience in illustration.

Figure 3A:
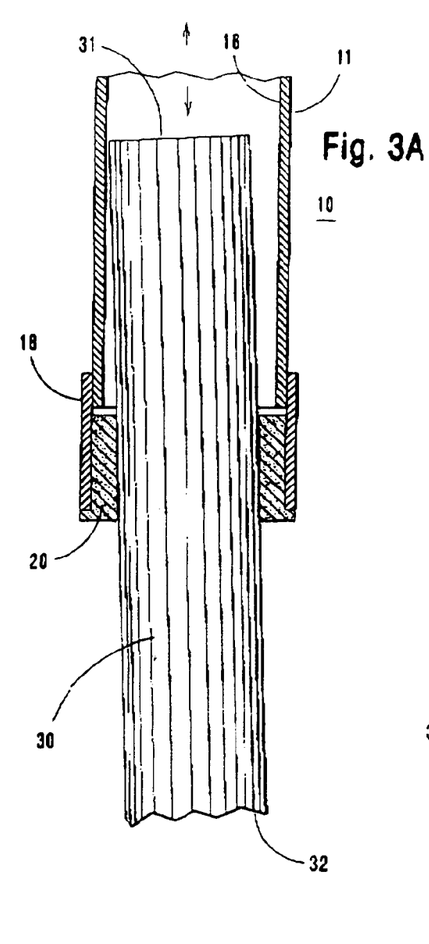
FIGS. 3a, 3b and 3c show cross sections of the expansion fitting of the invention in the process of having a length of lower conduit inserted inside.
Figure 3B:
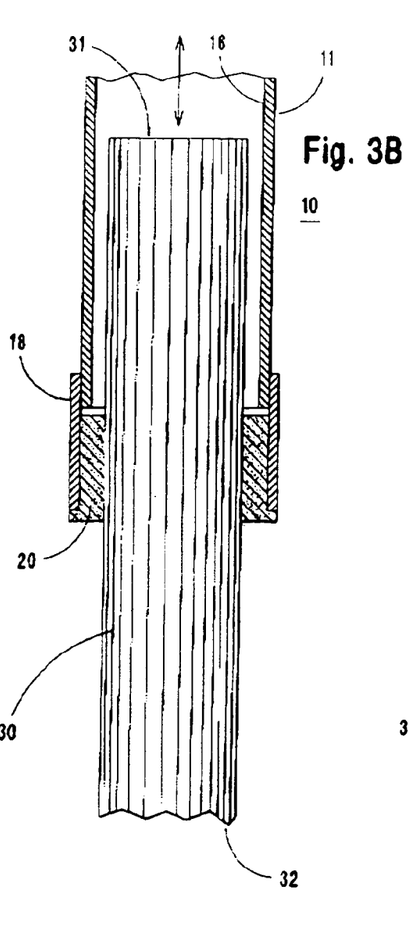
Figure 3C:
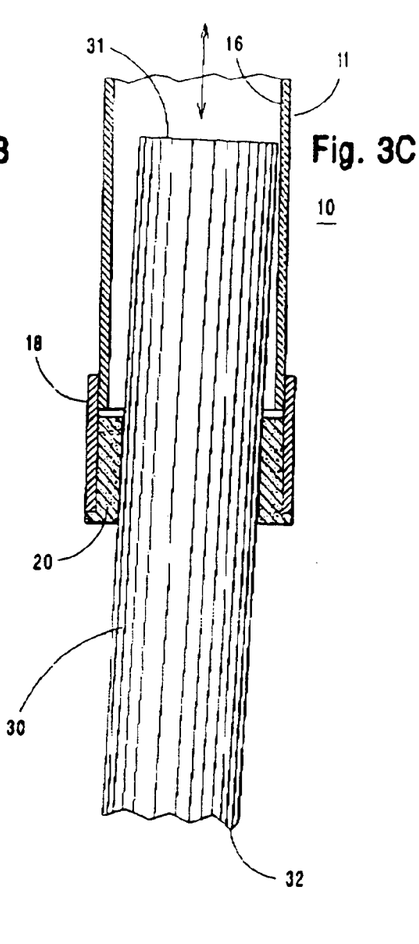

As shown in FIG. 2, which is a sectional view of assembly 11, the inner diameter 21 of sealing ring 20 is substantially less than either the inner diameter 16 of conduit section 11 or cap 18. Furthermore, inner diameter 21 is also substantially equal to or just slightly smaller than the outer diameter of lower conduit section 30, shown in FIG. 4, as well as FIGS. 3A through 3C, so that the upper end 31 of conduit section 30 slidingly fits into assembly 10 in close tolerance with sealing ring 20. Note, however, as shown in FIGS. 3A-3C, upper end 31 of conduit section 30 is not in close tolerance with inner diameter 16 of conduit section 11, which relationship allows for some substantial pivoting or side to side movement of the end 31 of conduit section 30 in relation to assembly 10. In FIG. 3A, upper end 31 of conduit section 30 is shown extending more or less straight into assembly 10, with the inner diameter 21 of sealing ring 20 pressing snugly against the conduit 30 so that a weatherproof seal is created. As shown by the arrows in FIG. 4, as well as FIGS. 3A through 3C, however, conduit 30 is also free to slide in assembly 10, so that if the lower end 32 of conduit 30 is pulled downwardly by forces caused by ground movement or settling, conduit 30 may slide downwardly in relation to assembly 10, thereby eliminating any strain on fitting 14 and electrical box 15.

FIGS. 3A and 3C, on the other hand, illustrate the conduit 30 being inserted into the fitting or conduit of the invention with significant angles or misalignment between the two, which may occur if the two are not carefully aligned with each other which, as explained, frequently occurs. It can be seen that in such case there is sufficient clearance between the OD of the end 31 of the conduit 30 and the ID or inner wall 16 of the fitting 10 comprised of conduit 30 to allow for considerable initial misalignment of the two structures while still allowing the two to be initially easily slipped together. Furthermore, although the amount of allowed misalignment, because of the combined geometry of the two cylindrical sections, becomes progressively less as the two are pushed together, or the one is slid into the other, with a preferred adjustment length differential between the ends of the two structures of 12 to 18 inches of possible overlap, considerable lateral differential or adjustment may still occur. In addition, in an alternative embodiment of the invention, the ID, and more usually or preferably, both the ID and the OD of the fitting may increase toward the top to prevent having to straighten the alignment of the inner member as it is inserted further into the outer fitting. The fitting 10 will usually be formed from ultraviolet light or sunlight resistant polyvinyl chloride, or PVC, pipe usually specified by utility companies and building codes for electric service conduit and there will be directions imprinted upon the surface in any suitable manner providing instructions that during installation the inner conduit will be inserted into the fitting at least 14 inches, this being somewhat more than the usual maximum settlement over a time period of most backfilling of about one foot or 12 inches. If even greater settlement is expected or likely, the length of the fitting 10 may be made greater.

As indicated above, forces caused by settling of the ground level may also tend to cause the lower end of 32 conduit 30 to be pulled to one side or the other, thereby tending to cause upper end 31 of conduit 30 to be pushed to the opposite side. For example, in FIG. 3A, upper end 31 of conduit 30 is shown angled somewhat to the left in relation to assembly 10, while in FIG. 3C upper end 31 of conduit 30 is shown angled somewhat to the right in relation to assembly 10. Notice that if the inner diameter 16 of conduit 11 was in close tolerance with the outer diameter of conduit 30, such pivoting movement would not be possible, yet the forces exerted on the bottom end 32 of conduit 30 would still be exerting the same sideways pressure on the conduit. With nothing to relieve the stress or frictional forces between the surfaces of the two members or conduits, conduit 30 would be prevented from sliding in member 10. The use of deformable sealing ring 20, however, allows for such pivoting up to a certain amount or degree yet its resilience prevents any direct contact between cylindrical members 11 and 30. In FIG. 3C, the upper right edge of sealing ring 20 is compressed on the right side of cap 18 while the lower edge of sealing ring 20 is compressed on the left side of cap 20, which allows upper end 31 of conduit 30 to pivot slightly to the right, yet due to such deformation of sealing ring 20 conduit 30 still slides easily in fitting assembly 10. Similarly, in FIG. 3A, the inner upper edge of sealing ring 20 is compressed on the left side of cap 18 and the inner lower edge of sealing ring 20 is compressed or deformed on the right side of cap 18, which enables upper end 31 of conduit 30 to pivot somewhat to the right while still being slideable in fitting assembly 10.

The deformable sealing ring 20 is made, or formed, preferably from a medium hardness rubber or soft resilient plastic which easily deforms to allow movement of the lower conduit section 30 within or against it. Such sealing ring, however, must be stiff enough to prevent the passage of small animals or insects into the connection box. It is not unusual, for example, for mice to squeeze through a cable connection into a junction box and hence into a building or for bees after detecting the heat of flowing current to gain access into a junction box and build a nest therein. Thus, the sealing ring should not only be sufficiently resistant or stiff to resist the passage of such living organisms when new, but should retain sufficient resistance over a fairly long periods to continue to provide a barrier during the life of the assembly.

Figure 5:
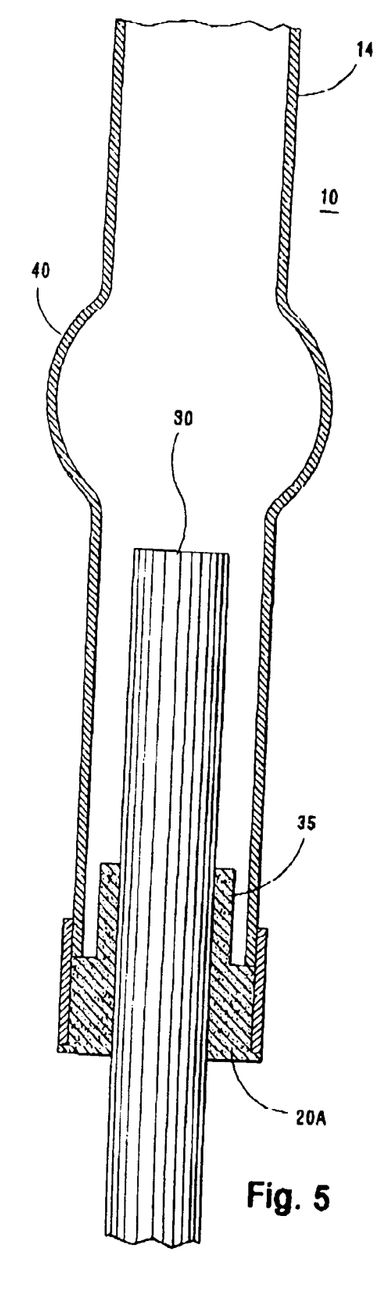
FIG. 5 is a sectional view of an alternative embodiment of the invention incorporating a cable storage section in the upper end of the fitting and a free sleeve-type gasket in the lower portion through which a lower conduit section is shown protruding.

If the upper portion of the fitting assembly 10 is elongated or extended somewhat beyond the maximum possible insertion of the lower conduit into it before any settlement occurs, the additional upper space may serve to provide room for some additional loops or coils of service wire or cable to also provide additional slack in the cable to allow for possible extension of such cable as the ground settles and the entire underground service is pulled downwardly below the service junction box. Such extra space in the upper portion of the fitting of the invention may be expanded if desired to provide an actual lateral extension or enlargement in the size or volume of the fitting of the invention above the extension area of the outer expansion section of fitting assembly 10 in which the lower or ground insertion conduit 30 is inserted, but below the threaded fitting 14 which is connected to the service box. In a variation of this arrangement, the wire or cable storage or reservoir section may be formed from a separate enlarged conduit section in which a loop or loops of service cable may be coiled and the enlarged conduit section connected by a threaded fitting to the service box, after which the slip fitting of the invention may be connected by threads to the lower portion of the enlarged conduit section. In FIG. 5, there is shown a version of the fitting of the invention having an integral enlarged upper section 40 that may be used to contain extra slack service cable. Such enlarged section should preferably be sufficient in size and configuration so as to not force the cable sections into too close contact with adjacent coils or lengths of cable in order to avoid detrimental induced currents through magnetic induction between cable sections. If desired, the inner surface of the plastic storage section 40 may have a spiral grooved inner surface configuration, not shown, to bias cable coils away from each other and minimize cross induction between the coils by providing a substantial space or spacing between the coils. As the ground sinks, tension in the service line will draw the lower coils out initially to provide the necessary slack in the cable to guard against undesirable tension in the service box and connecting conduits with progressive sinking or settlement progressively in turn drawing additional cable from the grooves into a straightened condition to provide the necessary slack to prevent undue tension on the cable and service box.

Figure 6:
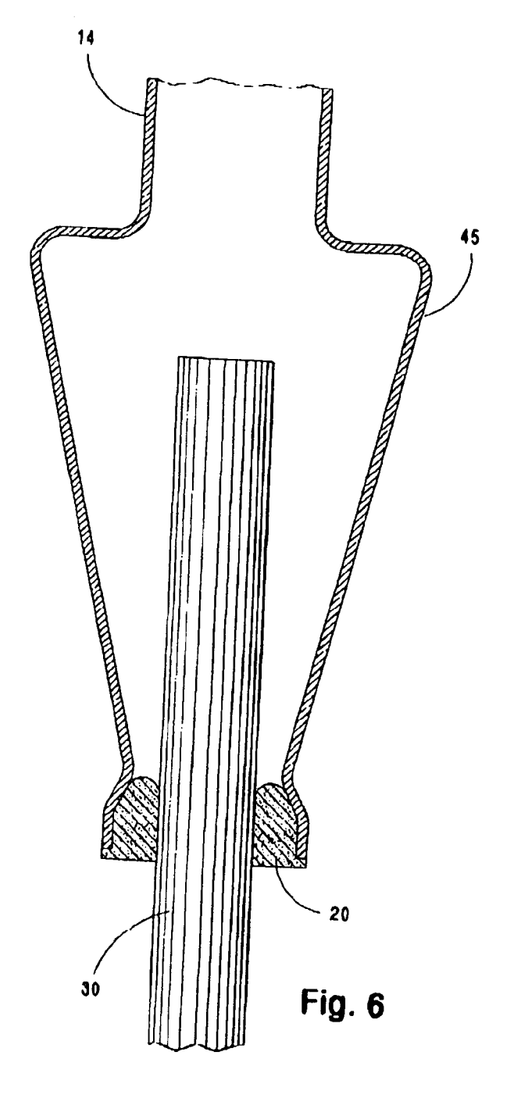
FIG. 6 is sectional view of an alternative embodiment of the invention in which the interior of the fitting progressively increases in inside diameter from the lower portion to the upper portion of the fitting.

In installing the fitting of the invention, the cable will initially be extended from the underground portion of the service 40 as shown in FIG. 4 and will extend from the vertical section 30 of the conduit. The fitting of the invention 10 may be kept unattached to either the conduit 30 or to the junction or service box 15 until the cable is extended into and through it and into the junction or service box 15. At this point, the conduit 30 may be passed into the fitting 10 and such fitting 10 moved into position to rotate it into threaded connection with the threads of the junction box. This will be easy to accomplish because the fitting 10 may be adjusted up and down to bring the screw threads 14 into engagement with matching threads on the junction or service box 15 or other connection usually just inside the box and because of the difference in diameters of the cylindrical inside of the fitting of the invention and the outside of the conduit 30, the two do not have to be aligned precisely parallel, but can be out of alignment by the amount of clearance provided between the internal wall of the fitting and external wall of the lower conduit section. As shown in FIGS. 3A through 3C, the angle of allowable misalignment between the two structures depends initially upon the flexibility of the gasket 20 in the bottom of the fitting 10 and immediately thereafter upon the difference between the outer diameter of the end of the lower conduit 30 which can be somewhat chamfered or rounded off, and the inner diameter 16 of the conduit section 11 of the fitting 10. While the maximum misalignment from a parallel relationship between the lower conduit 30 and the cylindrical inner wall or section 16 of the fitting 10 occurs at the lower portion of the fitting when the maximum possible angle or misalignment between two sections occurs, as the sections are pressed together or the lower conduit passed into the fitting this angle is decreased. Ordinarily, if the conduit 30 is not yet fixed in place to the wall, some give in the sod or dirt surrounding it will occur and if the two sections are forced together they will automatically be forced into a fair alignment. If the conduit 30 is already secured in place, however, it may be difficult to align or to force the alignment, since the conduit 30 must approach better and better alignment with the conduit 11 section of the fitting 10 as such fitting is pressed down along it and ultimately the threaded end 14 of fitting 10 must be screwed into the service box threaded fitting. On the other hand, if the inside diameter of the fitting 10 increases from bottom to top the conduit 30 may be allowed to slide into the fitting at a constant angle. Such an improved embodiment of the invention is shown in FIG. 6.

As an alternative the fitting 10 may be initially fitted into the threaded fitting on the service box and the conduit 30 left with sufficient play to be slipped into the bottom of the fitting 10 and after being pressed or extended towards the top of the fitting 10 the bottom of conduit 30 connected by screw threads or otherwise to the horizontal sections of the underground conduit. If the fitting of the invention has an expanded upper section as shown in either of FIG. 5 or 6 such expanded section should not be so large as to interfere with attachment of the fitting by screw threads to the base of the service box connected to the building wall.

In a practice followed by many utility companies the contractor will completely install the underground service line conduits plus the fitting 10 connected to the service box including using the straps 38 to clamp the fitting and the conduit to the wall of the building. The utility company then using a cable fish line extended through the service or meter box will draw the utility cable through the conduit from the street up through the fitting and up into the service box where it is connected. Meantime, the additional clearance and easy adjustment of the conduit connection to the fitting of the invention will have considerably facilitated easy installation even where there have been relatively sever misalignments and if settlement of the backfill later occurs adjustment of the connection and protective conduit occurs without breach of the conduit or damage to the service or face of the building.

As may be seen in FIG. 4, the detents 23 butt against the lower end of the service box 15 when the end of the fitting of the invention is screwed completely in. FIG. 4 shows a separate threaded fitting on the end of the slide fitting of the invention rather than a unitary fitting, but the method of connection of the fitting to the service box is the same.

Figure 7:
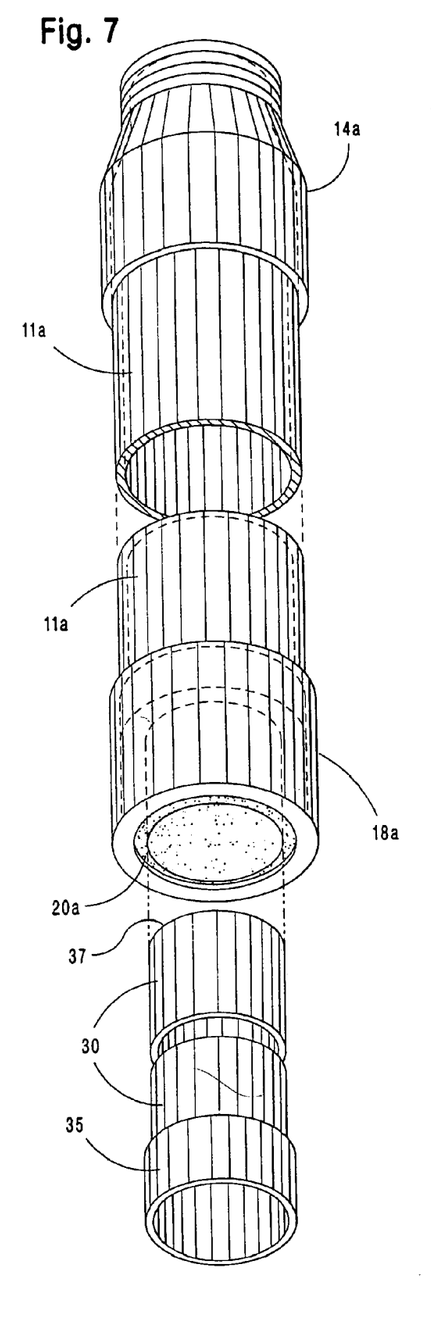
FIG. 7 is an isometric centrally bisected external lateral view of a preferred embodiment of the invention.

The sealing ring or gasket 20 will have sufficient thickness to be relatively stiff and will be sufficiently long in a longitudinal direction to provide substantial contact with the interior conduit to provide a significant barrier to prevent the passage of small animals, or rodents, and/or insects. The gasket rather than being in contact with the fitting over its entire length can, as shown in the lower portion of FIG. 5, be in the form of a free sleeve gasket 20A in which at the entrance to the fitting the gasket is in full contact with the inside of the fitting, but then has a space between it and the fitting so it closely encompasses the lower conduit over the entire length of the gasket, but contacts the walls of the fitting 10 only at the entrance thereof and is spaced therefrom farther along, generally allowing the lower conduit 30 to be more easily placed at an angle with respect to the fitting 10 without loosing a close or snug contact with such conduit. The free sleeve section 35 of the gasket 20A may be seen in the lower portion of FIG. 5. FIG. 7 is an isometric centrally bisected view of the outer shell of a presently preferred embodiment of the invention in which a rigid conduit section 11a has attached or secured to the lower end a fitting 18a with an internal sealing ring 20a as in the previous figures and at the upper end another separately attached screw threaded fitting 14a with a reduced diameter spirally threaded end which may screw into an electrical circuit or service box as shown for a previous embodiment in FIG. 4. A standard conduit section 30 dimensioned to fit properly through the sealing ring 20a in close contact therewith will be provided normally with a fitting 35 on the end for connection with further conduit leading into the ground and connecting with horizontal protective conduit if such is provided in the particular installation. The top 14a of the fitting may be provided as purchased with a standard service box connector or seal, not shown, threaded over the threads on the upper fitting 14a.

Normally the slip-joint fitting of the invention will be supplied as indicated with an interior slip-joint member 30 as shown, for example, in FIGS. 3, 4, 5 and 6. Frequently, however, the conduit section 30 will curve to the side and become more or less horizontal, either receiving electric cable buried directly in the ground or will be connected to separate underground conduit extending from the street service. It will also be understood that since one of the advantages of the preferred embodiments of the invention is that the slip fitting may be formed of conventional sizes of conduit, merely the outer member 11 of the slip-joint fitting may be sold and a conventional conduit preferably already provided with an end fitting used as the interior member. If desired, the upper end 37 of the standard conduit section 30 may be chamfered or rounded in order to enable it to slide easily along the wall of the outer conduit or slip-joint section. Such conduit section 30 is also shown bisected for convenience in illustration below bisected section 11a.

Figure 8:
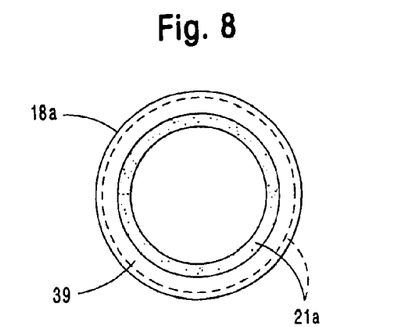
FIG. 8 is an end view of the fitting at one end of the embodiment shown in FIG. 7.

The lower fitting 18a in the embodiment shown in FIG. 7 and more particularly in cross section in FIG. 8 is provided with an outer lip or inwardly extending flange 39 which serve to confine the sealing ring against the end of the conduit or tube 30. Thus, the sealing ring 21a in the embodiment of FIGS. 7 and 8 may be held in place without being glued in place which is an advantage because the sealing ring composition is frequently difficult to securely adhere to the PVC of the various conduit materials, PVC, or polyvinylchloride, being the approved material for electrical conduit because of its fire resistance and minimum electrical conductivity, among other things. As shown in FIG. 8 the width of the sealing ring does not have to be exceptionally wide with such arrangement compared to that shown in FIGS. 2 and 3, for example, where a wider bottom portion is necessary to securely adhere the sealing ring to the outer conduit section.

Figure 9:
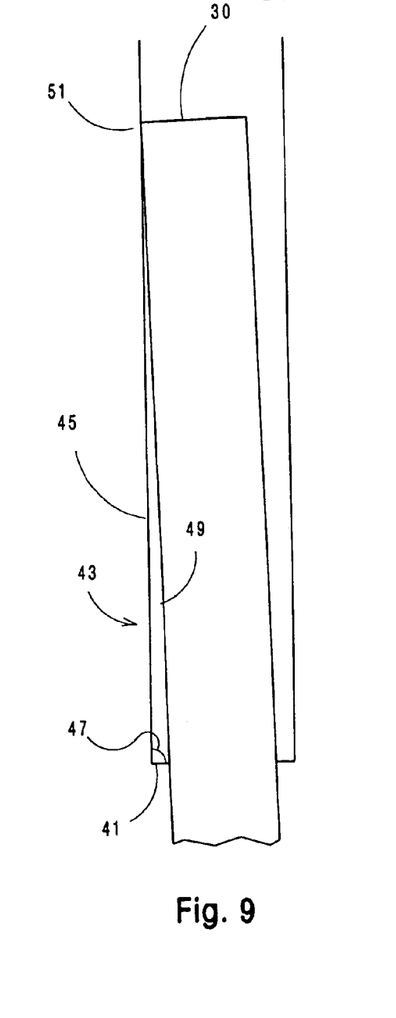
FIG. 9 is a diagram illustrating changing relationships in the invention during movement.

As noted above, when there is substantial misalignment between the inner and outer conduit sections, because of the geometrical relationship of the inner or smaller conduit to the larger or outer conduit of the slip-joint of the invention as determined by the thickness of the sealing ring which determines the smaller side of the right triangle formed when the inner conduit becomes misaligned with the outer conduit as shown in the diagram shown in FIG. 9 in which the right angle triangle in which the short side 41 of right angle triangle 43 represents the thickness of the sealing ring of the fitting of the invention and the long side 45 of the right angle triangle represents the length of the outer conduit 11 of the fitting. The short leg or side 41 is a constant along with right angle 47 while the length of the hypotenuse of such triangle representing the length of the inner conduit section from where it passes into the fitting through the sealing ring to where it, if misaligned with the outer conduit, contacts the inner surface of the outer conduit. As can be seen as the angle of misalignment 51 increases the location of contact of the inner tube from the end of the outer tube at which the seal is located decreases, or vice versa, in the downward direction indicating a withdrawal of the inner tube from the fitting, usually due to withdrawal of the smaller or inner conduit from the fitting due to subsidence of ground level. However, it will be seen that as the hypotenuse of the triangle becomes shorter the angle formed between the sides of the larger and smaller conduits becomes greater tending to relieve excess contacting pressure of the end of the small conduit with the side of the larger. Consequently, subsidence tends to decrease any jamming of the sides together because it increases the angle between them assuming that the maximum angle has not already been assumed. On the other hand, if it is desired to decrease jamming of the two structures due to misalignment when assembling the slip-joint, a joint construction similar to that shown in FIG. 6 may be desirable in which the possible angle of misalignment become greater or at least remains the same with movement of the inner conduit opposite to that caused by subsidence.

As will be readily recognized the fitting of the invention provides the adjustability necessary to allow the electrical service of a building to be readily connected while allowing complete and continuous shielding of the electric cable yet allowing for sinking of the fill around a building structure without pulling the electric service lines loose from the building or exposing such service lines to possible contact with the elements or persons who maybe in the vicinity. It also eliminates the necessity of forming plastic pipe sections of close tolerance, since the invention can be formed of readily available conduit sections if necessary with only a fitted rubber or other flexible and resilient polymeric material made specially, if necessary, to connect the two sections with an adjustable fit to allow for the frequent misalignments often met with in field installation.

While the present invention has been described at some length and with some particularity with respect to the several described embodiments, it is not intended that it should be limited to any such particulars or embodiments or any particular embodiment, but it is to be construed with references to the appended claims, so as to provide the broadest possible interpretation of such claims in view of the prior art and, therefore, to effectively encompass the intended scope of the invention.

I claim:
1. An adjustment facilitating means for interposition between an electrical service box on a wall of a building and an underground electrical service line comprising:
 (a) a first elongate hollow body formed of an approved polymeric material for use over electric service lines and of sufficient internal volume and shape to accommodate a substantial portion of a section of electrical conduit;
 (b) a fitting on a first end of said hollow body adapted for connection to an electrical service box with sufficient internal space for the passage of at least one electric service line;
 (c) an opening at a second end of the first elongate hollow body through which a second elongate hollow body is longitudinally slideable, and in which a second elongate hollow body section of electrical conduit can extend;
 (d) the second elongate hollow body having reduced external dimensions compared to the internal dimensions of the first elongate hollow body,
 (e) a circumferential resilient sealing ring within the opening in the second end of the first elongate hollow body adapted to closely surround the second elongate hollow body slideable through the opening in the second end of the first elongate hollow body and forming a seal between the two through which the second elongate hollow body may slide both during installation and in case of tension caused by earth movement.

2. The adjustment means in accordance with claim 1 wherein the fitting on the first end of the first elongate hollow body is adapted for direct attachment to an electrical service box.

3. An adjustment means in accordance with claim 1 wherein the first elongate hollow body has a cylindrical configuration and the fitting on the first end of the first elongate hollow body is an integrally molded fitting.

4. An adjustment means in accordance with claim 3 wherein the fitting on the first end of the first elongate hollow body is adapted for direct attachment to the electrical service box.

5. An adjustment means in accordance with claim 1 wherein the first elongate hollow body has a cylindrical configuration in the form of a conduit having a larger internal diameter than the second elongate hollow body conduit which the opening and sealing ring in the second end is adapted to receive and the fitting at the first end is a separate structure adapted for connection to an electrical service box.

6. An adjustment means in accordance with claim 5 wherein the fitting in the first end of the first elongate hollow body is adapted for direct attachment to the electrical service box.

7. An adjustment means in accordance with claim 1 wherein the first elongate hollow body is in the nature of a section of conduit having a larger internal diameter than the second elongate hollow body which the opening and sealing ring in the second end is adapted to receive.

8. An adjustment means in accordance with claim 7 wherein the opening at the second end of the first elongate hollow body is provided in a fitting secured to the larger conduit at such end.

9. An adjustment means in accordance with claim 8 wherein the fitting is in the form of a hollow cylindrical structure and the sealing ring is secured circumferentially in the hollow cylindrical structure.

10. An adjustment means in accordance with claim 8 wherein the fitting is in the form of a hollow cylindrical structure with an inwardly extending lip around the end and the sealing ring is constrained circumferentially in the hollow cylindrical structure between the inwardly extending lip and the end of the larger diameter conduit section forming the first elongate hollow body.

11. An arrangement for facilitating subsidence of a below ground level an electrical service line without damage to electrical service facilities attached to an adjacent elevated structure to which the electrical service line leads comprising:
 (a) a first section of hollow cylindrical configuration;
 (b) a second section of hollow cylindrical configuration;
 (c) a fitting on a first end of the first section of hollow cylindrical configuration adapted for connection to an electrical service box;
 (d) a fitting on a second end of the first section of hollow configuration, said fitting having within it a sealing ring adapted for sealing contact with the outer circumference of the second section of hollow cylindrical configuration,
 (e) the outer circumference of the second section of hollow cylindrical configuration being less than the inner circumference of the first section of hollow cylindrical configuration such that the second section of hollow configuration can assume at least a slightly angular position with respect to said first cylindrical position when at least partially contained therein;
 (f) the sealing ring having sufficient resiliency to allow variations of the angle of position of second cylindrical configuration within the first cylindrical configuration.

12. An arrangement in accordance with claim 11 wherein the second section of cylindrical configuration is a section of an electrical conduit.

13. An arrangement in accordance with claim 12 wherein the first section of cylindrical configuration is a section of an electrical conduit at least one standard size greater than the second section.

14. An arrangement in accordance with claim 13 wherein the fitting on the first end of the first section of hollow cylindrical configuration is integral with the hollow cylindrical configuration.

15. An arrangement in accordance with claim 13 wherein the fitting on the first section of the hollow cylindrical configuration is a separate fitting secured to the hollow cylindrical configuration.

16. An arrangement in accordance with claim 13 wherein the fitting at the second end of the first section of hollow cylindrical configuration is a separate fitting secured to the hollow cylindrical configuration and has the sealing ring secured by adhesive against the inner surface thereof.

17. An arrangement in accordance with claim 13 wherein the fitting at the second end of the first section of hollow cylindrical configuration is a separate fitting secured to the hollow cylindrical configuration and retains the sealing ring circumferentially therein by fitting between the end of the first cylindrical configuration and a lip about the circumference of the fitting.

* * * * *